United States Patent [19]
Svensson et al.

[11] Patent Number: 5,790,629
[45] Date of Patent: Aug. 4, 1998

[54] APPARATUS FOR MAKING X-RAY IMAGES

[76] Inventors: Stig Svensson, Ljungbackevägen 17, S-431 39 Onsala; Steen Olesen, Hallonvägen 67, S-448 37 Floda, both of Sweden; Matti Salmi, Kirkkokatu 16 B 9, FIN-33950 Pirkkala, Finland

[21] Appl. No.: 721,991

[22] PCT Filed: Apr. 7, 1995

[86] PCT No.: PCT/FI95/00193

§ 371 Date: Dec. 4, 1996

§ 102(e) Date: Dec. 4, 1996

[87] PCT Pub. No.: WO95/27922

PCT Pub. Date: Oct. 19, 1995

[30] Foreign Application Priority Data

Apr. 7, 1994 [FI] Finland .................. 941589

[51] Int. Cl.$^6$ ............................ H05G 1/10
[52] U.S. Cl. ........................ 378/98.7; 378/98.3
[58] Field of Search .................. 378/98.7, 98.8, 378/98.3, 96, 97, 98, 98.2

[56] References Cited

U.S. PATENT DOCUMENTS

| | | | |
|---|---|---|---|
| 4,952,794 | 8/1990 | Kemmer et al. | 250/213 VT |
| 4,982,418 | 1/1991 | Kuechnel | 378/98.7 |
| 5,049,749 | 9/1991 | Lange et al. | 250/327.2 |
| 5,150,396 | 9/1992 | Snoeren et al. | 378/98.3 |
| 5,179,582 | 1/1993 | Keller et al. | 378/96 |
| 5,187,730 | 2/1993 | Fujihara | 378/97 |
| 5,309,496 | 5/1994 | Winsor | 378/98.2 |

FOREIGN PATENT DOCUMENTS

| | | |
|---|---|---|
| 0 264 218 | 4/1988 | European Pat. Off. . |
| 0 547 679 | 6/1993 | European Pat. Off. . |

*Primary Examiner*—Don Wong
*Attorney, Agent, or Firm*—Pollock, Vande Sande & Priddy

[57] ABSTRACT

An apparatus for making X-ray images includes an X-ray source which is controlled by an X-ray source control. A luminescent screen provides a visible image based upon X-rays transmitted by the X-ray source. A CCD camera receives and stores the visible image. Imaging optics including a mirror reflect the visible image to the camera without splitting the visible image into parts. A photosensor is in optical communication with the luminescent screen and is separate from the CCD camera. The photosensor is positioned such that an illumination power of the luminescent screen falls on the photosensor practically from within an area of an entire portion of the visible image. A computer and control connectable to the X-ray source control for adjusting exposure of the apparatus is connected to the photosensor.

8 Claims, 4 Drawing Sheets

APPARATUS FOR MAKING X-RAY IMAGES

FIELD OF THE INVENTION

The Invention relates to an apparatus for making X-ray images.

BACKGROUND OF THE INVENTION

In clinical diagnostics, the quality of X-ray images is a very important factor. Furthermore, archiving and further processing of the images in a hospital environment imposes many special demands on the apparatus by which the X-ray images are made. One factor which increases the usability of the apparatus its small size and light weight.

Conventional apparatus, for example used for X-ray pneumography, comprises a plate on which a visible image is formed due to X-rays incident on the plate, and the film placed on the plate is exposed. The plate and the film are disposed in a cassette which is removed after each exposure. An apparatus is also known in which a latent image is formed on a drum with a selenium surface. Imaging comprises charging the drum by rotating the drum, image formation, and scanning of it for storage again by rotating the drum. The apparatus contains moving parts and is heavy.

Conventional X-ray apparatus has a measuring chamber in front of the photographic plate which measures the X-ray intensity incident on the plate and sends out a message to an automatic exposure control unit in connection with the X-ray generator after a specific exposure is attained. In this way, one tries to achieve a correct exposure at each picture taking.

An apparatus is known from U.S. Pat. No. 5,187,730 for an X-ray diagnostic system and method of picking up X-ray picture. The image is formed by an image intensifier which converts the X-rays into fluorescent light. There is also an optical system having a lens means for converting the fluorescent light and a beam splatter means for splitting the fluorescent light into a plurality of optical paths. The beam splitter is a partly transparent mirror so that a part of the fluorescent light is led to a photodetector, such as a photodiode. In the diagnostic system according to the above U.S. patent, there is a risk that part of the X-rays penetrate the reflecting mirror and the X-rays may cause damage to the CCD. Only a part of the fluorescent light is reflected to the photosensor so the quantity-of-light controller may use incorrect values in controlling the X-ray generator.

An X-ray imaging system including brightness control is also known from European Patent Application 547679. In this application, the image from the X-ray image intensifier is conducted through prisms. Part of the beam is reflected to a photodiode for automatic dose control or exposure timing. Also, in this apparatus, there is the disadvantage that some X-rays may penetrate through the prisms to the CCD sensor which may be damaged. Another disadvantage is that the photosensitive sensor sees only part of the light beam from the image intensifier.

An apparatus is also known from the European patent 264218 for making an image of an object by X-rays in which the image formed on a phosphor screen by the X-rays is stored by means of a CCD camera after which the image can be processed digitally. Exposure time is controlled by a shutter and the CCD is operated in slow scan mode which involves cooling down to at least −40° C. to decrease noise due to slow exposure of the picture and/or the read-out. Exposure times with this apparatus are generally minutes or even hours. The apparatus is adapted for X-ray inspection of objects, but it does not take into account needs of clinical X-raying.

SUMMARY OF THE INVENTION

The purpose of the invention is to obtain a new kind of apparatus for making X-ray images which is particularly suitable for X-raying patients in clinical examinations like for X-raying of lungs and bones. To accomplish this objective, the apparatus of this invention is provided with a photosensor which is separate from the CCD camera and is in optical communication with the image formed on the luminescent screen which sends out light of visible wavelength. The photosensor is positioned so that the illumination power of the luminescent screen falls on it practically within the area of the entire image. Thus, the intensity of the image formed can be directly measured allowing this information to be used for adjusting correct efficiency of exposure, time or quantity of exposure by connecting the sensor to the X-ray generator which controls the X-ray source. At the same time, a scale can be automatically set in a correct position in terms of the image processing and digitizing. The imaging optics also includes a mirror for reflecting the image on the luminescent screen to the CCD camera. The optical reflecting surface formed by the mirror also prevents X-rays which may have got through from hitting the sensitive imaging electronics.

As to the other advantageous embodiments of the invention, reference is made to the following description.

BRIEF DESCRIPTION OF THE DRAWINGS

The invention will be described in more detail in the following referring to the enclosed drawings in which.

DETAILED DESCRIPTION OF THE PREFERRED EMBODIMENTS

Figure 1:
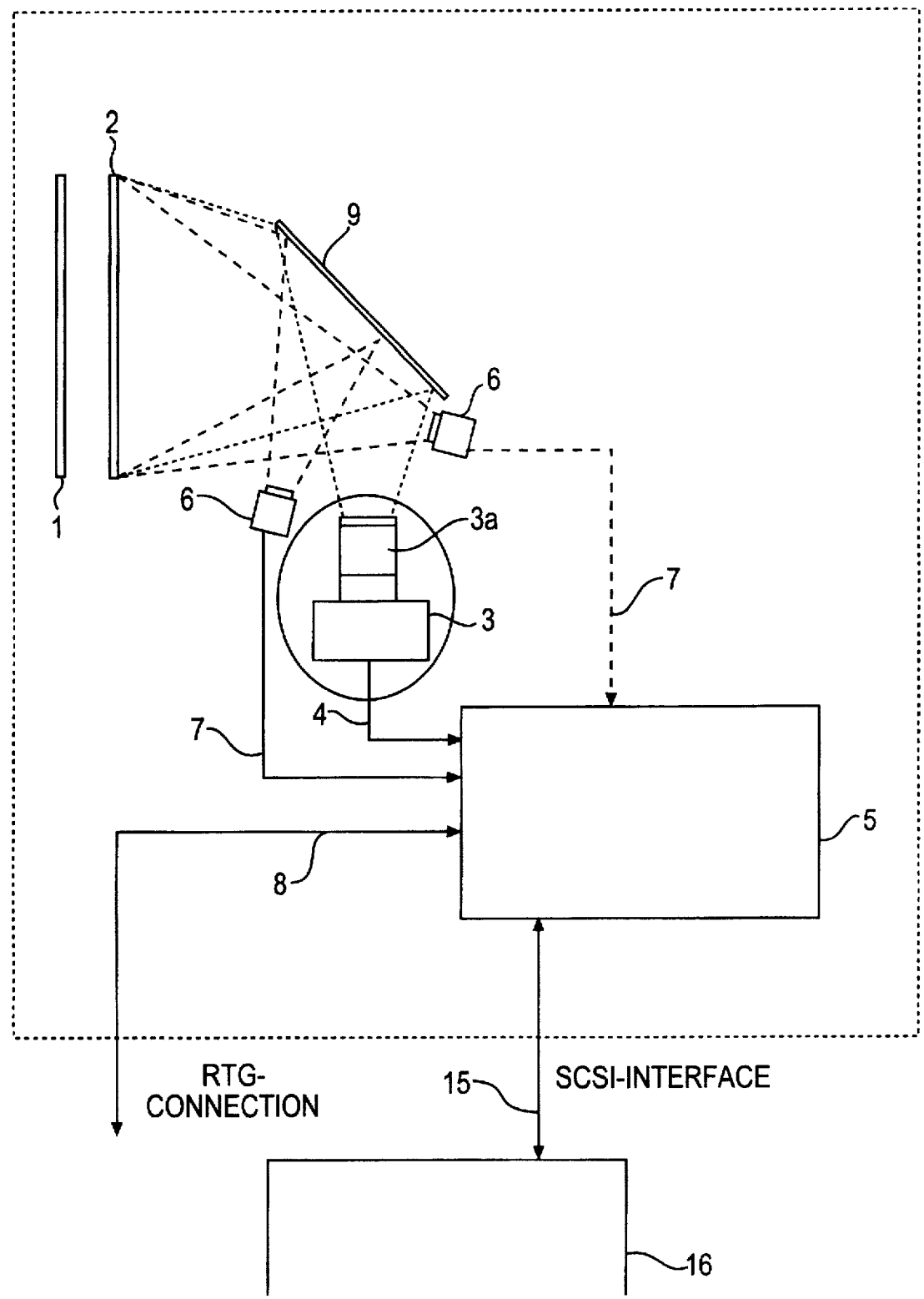
FIG. 1 shows the apparatus according to the invention as a section.

FIG. 1 shows the apparatus according to the invention as a section. The figure shows the grid 1 of the apparatus arranged to diminish the injurious effect of the secondary radiation from the patient. The X-rays that have passed through the patient are incident on the luminescent screen 2 forming thereon a visual image which sends out radiation at visible wavelength. The luminescent screen 2 may be a known phosphor screen which gets the necessary energy to generate the image from the X-ray radiation; in other words, no amplification is performed by means of any other externally supplied energy although it is sometimes also called an intensifier screen. The beam cone of the image to be stored is marked in the drawing with dashed lines and the image is received with a 2-dimensional charge-coupled device image transducer (CCD) which is part of the CCD camera 3 which also comprises conventional imaging optics 3a. An interface 4 leads from the camera to the electronic unit 5 of the apparatus which performs image processing, e.g. digitizing, and transmission of control signals along the communication line 15 further to various auxiliary devices 16.

The apparatus is provided with a photosensor 6 which may be any known sensor measuring intensity of visible light. The sensor is connected with a data transfer line 7 to said electronic unit 5 which is provided with computing and control means for processing the data supplied by the sensor.

From this part leads also a data transfer line 8 leads to the X-ray generator (RTG) which controls the X-ray source.

Figure 2:
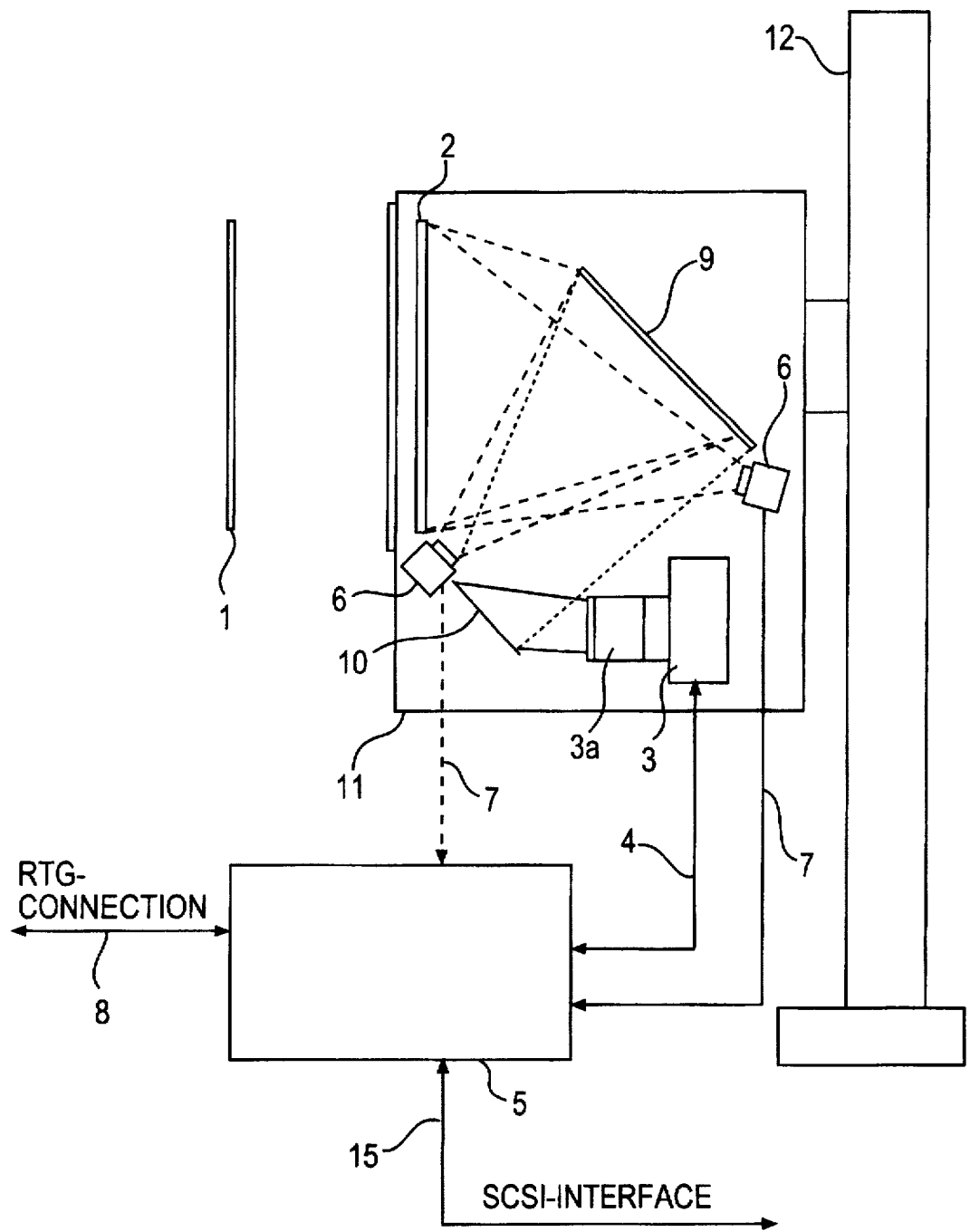
FIG. 2 shows a second embodiment of the invention as a section.

FIG. 1 shows how the cone of the light beams to be imaged is turned by the mirror 9 to the camera 3 located at the lower part of the apparatus. The photosensor 6 is located beside the light cone of the light beams which accomplishes storage of the image, for example in the manner shown in the figure opposite to the mirror 9 beside the CCD camera. The photosensor 6 may also be positioned in the apparatus so that it directly "sees" the image on the luminescent screen 2; i.e., it is then opposite to the luminescent screen 2 beside the mirror 9. FIG. 2 shows the alternative wherein the mirror 9 reflects the cone incident from the luminescent screen 2 to an additional mirror 10 located opposite thereto, arranged below the lower part of the luminescent screen, and finally reflects the cone to the CCD camera 3 at the lower part of the apparatus. In this case, the apparatus will have a more compact structure when the above components are placed into the frame housing 11. The figure further shows how the sensor 6 may also, in this alternative, be located opposite mirror 9 and be placed beside mirror 10.

Dashed lines indicate the cone of those light beams which leave the luminescent screen 2 at a different angle to the sensor than the cone of the light beams which go to the actual image storage. Thus, the sensor 6 is not in the way of the light beams, and no prisms or the like are needed in the apparatus to split the light for storing and measuring the image.

In the present invention, the mirror (or mirrors) make it possible to prevent X-rays which may have gotten through from hitting the sensitive electronics because the optically reflecting surface accomplished by the mirror directs only the beams of visible light into the imaging electronics. The frame housing 11 may be arranged to be movable along a vertical guide 12 to the right height. A correct dosage is automatically accomplished by the photosensor 6 because its measuring signal is transmitted to the computing and control means which control the X-ray source to obtain a correct exposure. In practice, this may take place so that as a predetermined quantity of exposure is reached, a signal is transmitted to the control means of the X-ray source which switches off the X-ray generator. Exposure times in clinical X-raying may in this case be about 10 ms. At the same time, a scale is automatically established in a correct range from the point of view of image processing. No mechanical shutters are needed in the optical path between the luminescent screen 2 and the 2-dimensional CCD image transducer because, between exposures, the image transducer is practically in darkness inside the frame housing and it can be calibrated by measuring the output signal at this situation.

Figure 3:
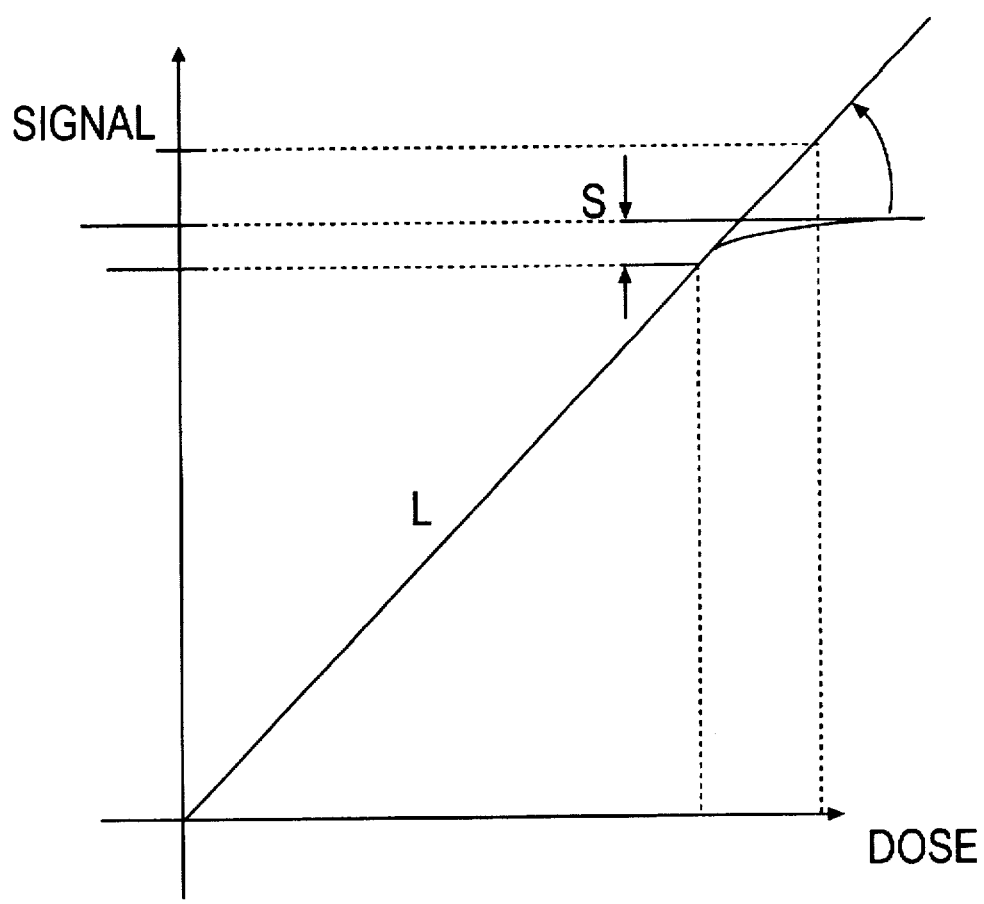
FIG. 3 shows how the dynamical range is extended in the apparatus according to the invention.

FIG. 3 shows a typical characteristic curve of a CCD element which represents the signal strength of the element as a function of dosage. Thus, the question is whether the image is obtained from a single image point or pixel. At high dosage, the effect of the anti-blooming action of the CCD camera manifests itself by preventing the electrons from escaping to nearby elements and "smearing" of the image at high dosage. In the apparatus, the effect of this so-called saturation region S to the image is eliminated so that the dynamic range is extended in accordance with the straight portion of the graph in the linear range L so that when the obtained signals are in the saturation region S, they are numerically corrected to correspond to actual values. In this case, high accuracy is obtained in the image processing in regions of high dosage, like in pneumography in those areas of the image obtained particularly from the patient's peripheral areas, the corresponding CCD elements of which receive dosage above normal. The correction in question can be performed in the electronic unit 5 of the apparatus by a suitable program before the image data is sent out for further processing.

Figure 4:
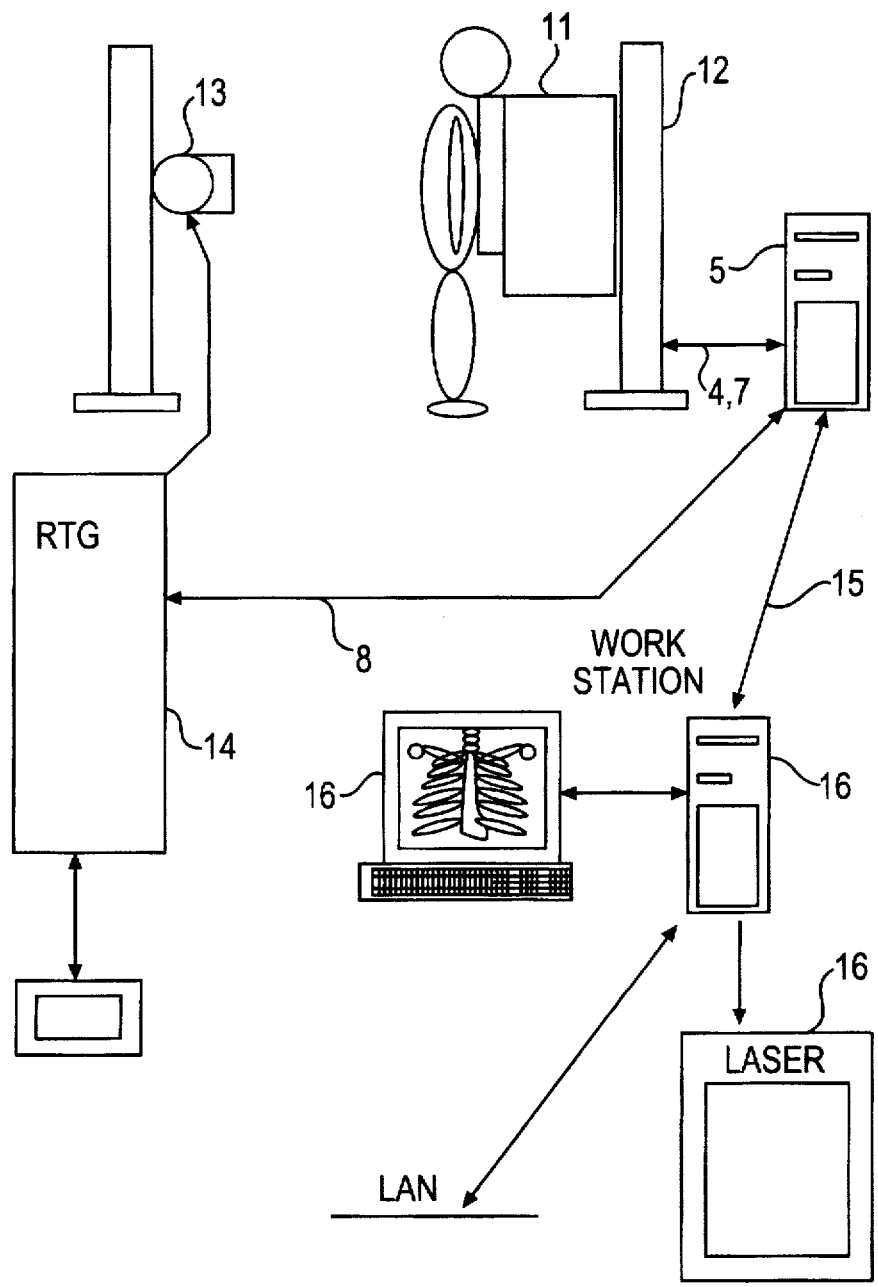
FIG. 4 shows the location of the apparatus in a larger system.

FIG. 4 finally shows the apparatus in the environment in which the picture is taken. The apparatus comprises the frame housing 11 and the electronic unit 5 which communicates with the control means 14 of the X-ray source 13, i.e., the X-ray generator RTG. The system further comprises auxiliary devices 16 for storing the image data, displaying them on the screen or outputting them, or transmitting the image data further.

The invention utilizes a high-resolution CCD camera 3 with several image points or pixels. This kind of camera is temperature stabilized, but because it operates as a quick camera (flash mode), with exposure times typically below 100 ms, it needs no cooling to improve the signal-to-noise ratio. The apparatus suits well for use in connection with conventional X-ray instruments which require no changes due to the apparatus.

In connection with the present invention it is advantageous to employ a CCD camera in which the CCD image transducer is as sensitive as possible so that in the X-raying process the patient is exposed to a minimum amount of X-ray radiation. One such sensitive CCD image transducer is a thinned CCD image transducer used in for example astronomical imaging instruments. In an image transducer of this type, the rear surface of the of the COD image transducer is thinned so that light beams can be directed into the image transducer from the rear side, whereas in conventional CCD image transducers the light beams are directed from the front side of the image transducer. Sensitivity of the CCD image transducer may be further increased by adding a phosphorescent layer, most advantageously to the front side of the CCD image transducer. The CCD image transducers described above have sensitivities even 2–3 times higher as compared to conventional CCD image transducers.

We claim:

1. An apparatus for making X-ray images, comprising:
   an X-ray source controlled by an X-ray source control means;
   a luminescent screen for providing a visible image based upon X-rays transmitted by said X-ray source;
   a CCD camera for receiving and storing said visible image;
   imaging optics including a mirror for reflecting said visible image to the camera without splitting said visible image into parts;
   a photosensor in optical communication with said luminescent screen and separate from said CCD camera, said photosensor being positioned such that an illumination power of said luminescent screen falls on said photosensor practically from within an area of an entire portion of said visible image; and
   computing and control means connected to said photosensor, said computing and control means being connectable to said X-ray source control means for adjusting exposure of said apparatus.

2. Apparatus according to claim 1, wherein the imaging optics and the photosensor are positioned apart so that a first cone collected by the imaging optics and a second cone collected by the photosensor leave the luminescent screen at an angle to each other.

3. Apparatus according to claim 2, wherein the photosensor is positioned opposite the mirror so that the illumination power reflected by the mirror is transmitted directly thereto.

4. Apparatus according to claim 3, wherein the photosensor is positioned beside the CCD camera to receive light reflected by the mirror.

5. Apparatus according to claim 3, further comprising an additional mirror for reflecting the visible image reflected by the mirror to the CCD camera, the photosensor being disposed beside the additional mirror.

6. Apparatus according to claim 1, further comprising an electronic unit including a program which is arranged to correct at high quantities of exposure a signal obtained from a luminous point in a saturation range to correspond to a dependent of signals in a linear range on a quantity of exposure.

7. Apparatus according to claim 1, wherein the CCD camera comprises a thinned CCD-image transducer.

8. The apparatus according to claim 1, wherein said luminescent screen is a phosphor screen.

* * * * *